(12) United States Patent
Nishimura et al.

(10) Patent No.: US 9,257,233 B2
(45) Date of Patent: Feb. 9, 2016

(54) METHOD FOR MANUFACTURING LAMINATED CERAMIC CAPACITOR

(71) Applicant: MURATA MANUFACTURING CO., LTD., Nagaokakyo-shi, Kyoto-Fu (JP)

(72) Inventors: Hitoshi Nishimura, Nagaokakyo (JP); Masahiro Naito, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 210 days.

(21) Appl. No.: 13/848,775

(22) Filed: Mar. 22, 2013

(65) Prior Publication Data

US 2013/0222971 A1    Aug. 29, 2013

Related U.S. Application Data

(63) Continuation of application No. PCT/JP2012/051057, filed on Jan. 19, 2012.

(30) Foreign Application Priority Data

Jan. 21, 2011  (JP) ................. 2011-010496

(51) Int. Cl.
*H01G 4/12* (2006.01)
*C04B 35/486* (2006.01)
(Continued)

(52) U.S. Cl.
CPC .............. *H01G 4/1236* (2013.01); *B32B 18/00* (2013.01); *C01G 23/003* (2013.01); *C01G 25/006* (2013.01); *C04B 35/486* (2013.01); *C04B 35/49* (2013.01); *H01B 3/12* (2013.01); *H01G 4/30* (2013.01); *C04B 2235/3208* (2013.01); *C04B 2235/3213* (2013.01);
(Continued)

(58) Field of Classification Search
CPC ... H01G 9/052; H01G 9/0525; H01G 4/1218; H01G 4/1245; H01G 4/30; C04B 35/6303
USPC .................. 29/25.41–25.42, 25.03, 825, 830; 361/303, 311, 321.2–321.5; 501/135–136
See application file for complete search history.

(56) References Cited

U.S. PATENT DOCUMENTS 5,036,424 A * 7/1991 Yokotani et al. ........... 361/321.4
5,841,626 A   11/1998 Sano et al.
(Continued)

FOREIGN PATENT DOCUMENTS

CN  1326203 A   12/2001
JP  10335169 A  12/1998
(Continued)

OTHER PUBLICATIONS

PCT/JP2012/051057 Written Opinion dated Apr. 5, 2012.

*Primary Examiner* — Minh Trinh
(74) *Attorney, Agent, or Firm* — Arent Fox LLP

(57) ABSTRACT

A method of manufacturing a laminated ceramic capacitor having a dielectric ceramic which contains, as its main constituent, a perovskite-type compound containing Ca and Zr and optionally containing Sr, Ba, and Ti, and further contains Si, Mn, and Al, and when the total content of Zr and Ti is regarded as 100 parts by mol, the total content (100×m) of Ca, Sr, and Ba meets $1.002 \leq m \leq 1.100$ in terms of parts by mol, the Si content n meets $0.5 \leq n \leq 10$ in terms of parts by mol, the Mn content u meets $0.5 \leq u \leq 10$ in terms of parts by mol, and the Al content w meets $0.02 \leq w \leq 4$ in terms of parts by mol, m and n satisfying $-0.4 \leq 100(m-1)-n \leq 3.9$.

4 Claims, 1 Drawing Sheet

(51) Int. Cl.
*C04B 35/49* (2006.01)
*H01B 3/12* (2006.01)
*H01G 4/30* (2006.01)
*B32B 18/00* (2006.01)
*C01G 23/00* (2006.01)
*C01G 25/00* (2006.01)

(52) U.S. Cl.
CPC .......... *C04B 2235/3215* (2013.01); *C04B 2235/3217* (2013.01); *C04B 2235/3232* (2013.01); *C04B 2235/3262* (2013.01); *C04B 2235/3418* (2013.01); *C04B 2235/6025* (2013.01); *C04B 2235/6562* (2013.01); *C04B 2235/6584* (2013.01); *C04B 2235/768* (2013.01); *C04B 2235/79* (2013.01); *C04B 2235/80* (2013.01); *C04B 2235/85* (2013.01); *C04B 2235/9669* (2013.01); *C04B 2237/348* (2013.01); *C04B 2237/704* (2013.01); *H01G 4/1245* (2013.01)

(56) References Cited

U.S. PATENT DOCUMENTS

| | | | |
|---|---|---|---|
| 7,342,767 B2 * | 3/2008 | Naito et al. | 361/321.2 |
| 8,390,985 B2 * | 3/2013 | Naito et al. | 361/321.4 |
| 8,853,115 B2 * | 10/2014 | Iguchi et al. | 501/135 |
| 2006/0126266 A1 * | 6/2006 | Jain et al. | 361/303 |
| 2012/0147518 A1 * | 6/2012 | Matsuda et al. | 361/301.4 |
| 2013/0107418 A1 * | 5/2013 | Nakamura et al. | 361/301.4 |
| 2013/0222971 A1 * | 8/2013 | Nishimura et al. | 361/301.4 |
| 2014/0078642 A1 * | 3/2014 | Shinichi | 361/301.4 |

FOREIGN PATENT DOCUMENTS

| | | |
|---|---|---|
| JP | 2001-351828 A | 12/2001 |
| JP | 2007-091588 A | 4/2007 |
| JP | 2009-007209 A | 1/2009 |

* cited by examiner

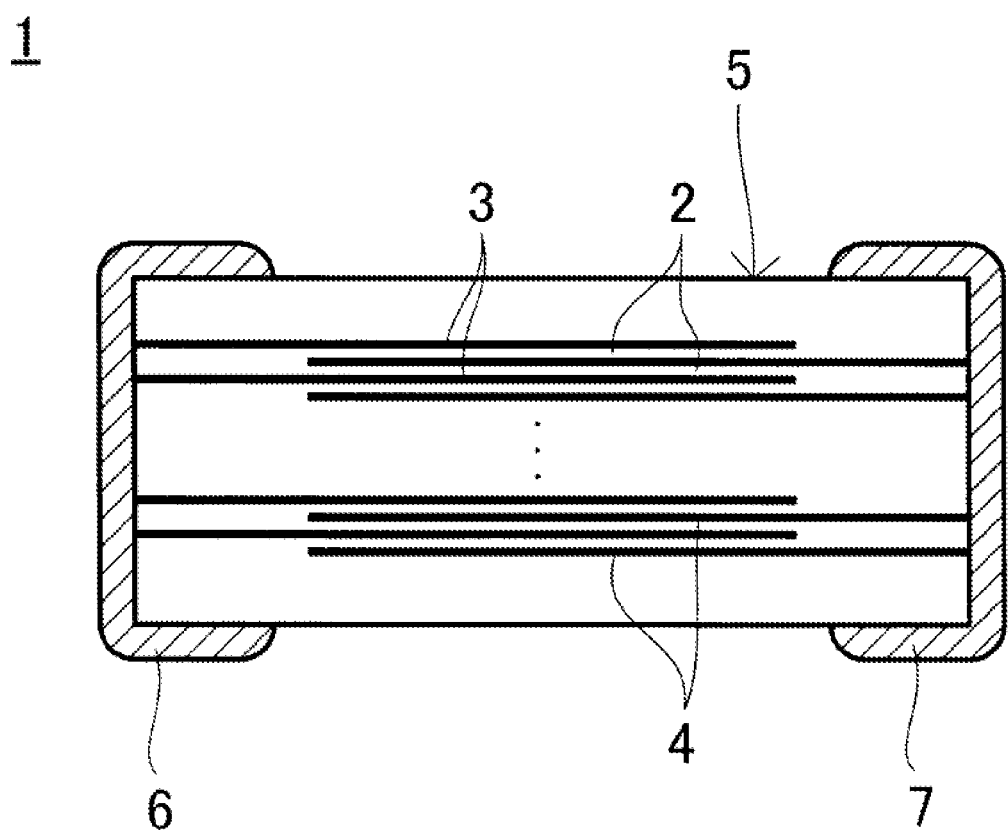

… (1)

METHOD FOR MANUFACTURING LAMINATED CERAMIC CAPACITOR

CROSS REFERENCE TO RELATED APPLICATIONS

The present application is a continuation of International application No. PCT/JP2012/051057, filed Jan. 19, 2012, which claims priority to Japanese Patent Application No. 2011-010496, filed Jan. 21, 2011, the entire contents of each of which are incorporated herein by reference.

FIELD OF THE INVENTION

The present invention relates to a laminated ceramic capacitor. In addition, the present invention relates to a method for manufacturing a laminated ceramic capacitor.

BACKGROUND OF THE INVENTION

With the progress of recent electronics technology, the reduction in size and the increase in capacitance have been required for laminated ceramic capacitors. In order to satisfy these requirements, the reduction in layer thickness has been advanced for dielectric layers of laminated ceramic capacitors. However, the reduction of the dielectric layers in layer thickness relatively increases the electric field intensity applied per layer. Therefore, improvements in reliability in the case of applying a voltage, in particular, improvements in lifetime characteristics in a moisture resistance loading test have been required for the dielectric ceramic for use in the dielectric layers.

For example, Patent Document 1 discloses a dielectric ceramic containing a main composition represented by $[(Ca_xSr_{1-x})O]_m[(Ti_yZr_{1-y})O_2]$ as a main constituent where the values of x, y, and m respectively fall within the ranges of $0 \leq x \leq 1$, $0 \leq y \leq 0.10$, $0.75 \leq m \leq 1.04$, and containing, as accessory constituents for the main constituent, 0.2 to 5 mol % of Mn oxide in terms of MnO, 0.1 to 10 mol % of Al oxide in terms of $Al_2O_3$, and 0.5 to 15 mol % of constituent represented by $[(Ba_zCa_{1-z})O]_VSiO_2$ where Z and V respectively fall within the ranges of $0 \leq Z \leq 1$ and $0.5 \leq V \leq 4.0$. Further, the accelerated test carried out at a high temperature and under a direct electric field concludes that a dielectric ceramic is achieved which has insulation resistance for a long accelerated lifetime.

Patent Document 1: Japanese Patent Application Laid-Open No. 10-335169

SUMMARY OF THE INVENTION

However, the dielectric ceramic described in Patent Document 1 has the problem of insufficient lifetime characteristics in a moisture resistance loading test. In general, $[(Ca_xSr_{1-x})O]_m[(Ti_yZr_{1-y})O_2]$ based ceramics are likely to have residual stress increased, and often cause defects of peeled internal electrodes to decrease the lifetime characteristics in moisture resistance loading tests.

The present invention has been achieved in view of the problems, and an object of the present invention is to provide a laminated ceramic capacitor which produces excellent lifetime characteristics in moisture resistance loading tests.

A laminated ceramic capacitor according to the present invention has: a laminated body including a plurality of dielectric layers stacked, and a plurality of internal electrodes formed along the interfaces between the dielectric layers; and a plurality of external electrodes formed on the outer surface of the laminated body, and electrically connected to the internal electrode, and the laminated ceramic capacitor is characterized in that the laminated body has a composition containing, as its main constituent, a perovskite-type compound containing Ca and Zr and optionally containing Sr, Ba, and Ti, and further containing Si, Mn, and Al, and when the total content of Zr and Ti is regarded as 100 parts by mol, the total content (100×m) of Ca, Sr, and Ba meets $1.002 \leq m \leq 1.100$ in terms of parts by mol, the Si content n meets $0.5 \leq n \leq 10$ in terms of parts by mol, the Mn content u meets $0.5 \leq u \leq 10$ in terms of parts by mol, and the Al content w meets $0.02 \leq w \leq 4$ in terms of parts by mol, m and n satisfying $-0.4 \leq 100(m-1)-n \leq 3.9$, further, the molar ratio s of Ti/(Zr+Ti) is $0 \leq s \leq 0.50$, the molar ratio y of Sr/(Ca+Sr+Ba) is $0 \leq y \leq 0.29$, and the molar ratio z of Ba/(Ca+Sr+Ba) is $0 \leq z \leq 0.29$, y and z satisfying $0 \leq y+z \leq 0.29$.

In addition, a laminated ceramic capacitor according to the present invention has: a laminated body including a plurality of dielectric layers stacked, and a plurality of internal electrodes formed along the interfaces between the dielectric layers; and a plurality of external electrodes formed on the outer surface of the laminated body, and electrically connected to the internal electrode, and the laminated ceramic capacitor is characterized in that the laminated body has a composition containing, as its main constituent, a perovskite-type compound containing Ca and Zr and optionally containing Sr, Ba, and Ti, and further containing Si, Mn, and Al, and in case the laminated body is dissolved in a solvent, when the total content of Zr and Ti is regarded as 100 parts by mol, the total content (100×m) of Ca, Sr, and Ba meets $1.002 \leq m \leq 1.100$ in terms of parts by mol, the Si content n meets $0.5 \leq n \leq 10$ in terms of parts by mol, the Mn content u meets $0.5 \leq u \leq 10$ in terms of parts by mol, and the Al content w meets $0.02 \leq w \leq 4$ in terms of parts by mol, m and n satisfying $-0.4 \leq 100(m-1)-n \leq 3.9$, further, the molar ratio s of Ti/(Zr+Ti) is $0 \leq s \leq 0.50$, the molar ratio y of Sr/(Ca+Sr+Ba) is $0 \leq y \leq 0.29$, and the molar ratio z of Ba/(Ca+Sr+Ba) is $0 \leq z \leq 0.29$, y and z satisfying $0 \leq y+z \leq 0.29$.

In addition, a laminated ceramic capacitor according to the present invention has: a laminated body including a plurality of dielectric layers stacked, and a plurality of internal electrodes formed along the interfaces between the dielectric layers; and a plurality of external electrodes formed on the outer surface of the laminated body, and electrically connected to the internal electrode, and the laminated ceramic capacitor is characterized in that the dielectric layers have a composition containing, as its main constituent, a perovskite-type compound containing Ca and Zr and optionally containing Sr, Ba, and Ti, and further containing Si, Mn, and Al, and when the total content of Zr and Ti is regarded as 100 parts by mol, the total content (100×m) of Ca, Sr, and Ba meets $1.002 \leq m \leq 1.100$ in terms of parts by mol, the Si content n meets $0.5 \leq n \leq 10$ in terms of parts by mol, the Mn content u meets $0.5 \leq u \leq 10$ in terms of parts by mol, and the Al content w meets $0.02 \leq w \leq 4$ in terms of parts by mol, m and n satisfying $-0.4 \leq 100(m-1)-n \leq 3.9$, further, the molar ratio s of Ti/(Zr+Ti) is $0 \leq s \leq 0.50$, the molar ratio y of Sr/(Ca+Sr+Ba) is $0 \leq y \leq 0.29$, and the molar ratio z of Ba/(Ca+Sr+Ba) is $0 \leq z \leq 0.29$, y and z satisfying $0 \leq y+z \leq 0.29$.

Further, in the laminated ceramic capacitors according to the present invention, the internal electrodes preferably contain Ni or a Ni alloy as their main constituent.

In addition, a method for manufacturing a laminated ceramic capacitor according to the present invention includes the steps of: preparing a main constituent powder containing, as its main constituent, a perovskite-type compound containing Ca and Zr and optionally containing Sr, Ba, and Ti; preparing a Si compound, a Mn compound, an Al compound; mixing the main constituent powder, the Si compound, the Mn compound, and the Al compound, and then obtaining ceramic slurry; obtaining ceramic green sheets from the ceramic slurry; stacking the ceramic green sheets and internal electrode layers to obtain an unfired laminated body; and firing the unfired laminated body to obtain a laminated body with internal electrodes formed between dielectric layers, and the method is characterized in that, for the respective elements of the dielectric layers, when the total of Zr and Ti is regarded as 100 parts by mol, the total content (100×m) of Ca, Sr, and Ba meets $1.002 \leq m \leq 1.100$ in terms of parts by mol, the Si content n meets $0.5 \leq n \leq 10$ in terms of parts by mol, the Mn content u meets $0.5 \leq u \leq 10$ in terms of parts by mol, and the Al content w meets $0.02 \leq w \leq 4$ in terms of parts by mol, m and n satisfying $-0.4 \leq 100(m-1)-n \leq 3.9$, further, the molar ratio s of Ti/(Zr+Ti) is $0 \leq s \leq 0.50$, the molar ratio y of Sr/(Ca+Sr+Ba) is $0 \leq y \leq 0.29$, and the molar ratio z of Ba/(Ca+Sr+Ba) is $0 \leq z \leq 0.29$, y and z satisfying $0 \leq y+z \leq 0.29$.

Further, in the laminated ceramic capacitors or the method for manufacturing a laminated ceramic capacitor according to the present invention, m and n preferably satisfy the relationship of $0 \leq 100(m-1)-n \leq 2.0$.

The dielectric ceramic according to the present invention has the composition as described above, thereby making it possible to provide a laminated ceramic capacitor which produces excellent lifetime characteristics in a moisture resistance loading test even when a voltage with a high electric field intensity is applied to dielectric layers further reduced in thickness.

BRIEF EXPLANATION OF THE DRAWING

FIG. 1 is a cross-sectional view illustrating a laminated ceramic capacitor according to the present invention.

DESCRIPTION OF PREFERRED EMBODIMENTS OF THE INVENTION

An embodiment for carrying out the present invention will be described below.

FIG. 1 is a cross-sectional view of a laminated ceramic capacitor according to the present invention.

The laminated ceramic capacitor 1 includes a laminated body 5. The laminated body 5 includes a plurality of dielectric layers 2 stacked, and a plurality of internal electrodes 3 and 4 formed along the interfaces between the plurality of dielectric layers 2. Materials for the internal electrodes 3 and 4 include, for example, a material containing Ni as its main constituent.

External electrodes 6 and 7 are formed in different positions on the outer surface of the laminated body 5. Materials for the external electrodes 6 and 7 include, for example, a material containing Ag or Cu as its main constituent. In the laminated ceramic capacitor shown in FIG. 1, the external electrode 6 and 7 are formed on respective end surfaces of the laminated body 5, which are opposed to each other. The internal electrodes 3 and 4 are electrically connected respectively to the external electrodes 6 and 7. Furthermore, the internal electrodes 3 and 4 are stacked alternately with the dielectric layers 2 interposed therebetween in the laminated body 5.

It is to be noted that the laminated ceramic capacitor 1 may be a two-terminal capacitor including two external electrodes 6 and 7, or may be a multi-terminal capacitor including a larger number of external electrodes.

The dielectric layers 2 contains, as its main constituent, a perovskite-type compound containing Ca and Zr and optionally containing Sr, Ba, and Ti, and when the total content of Zr and Ti is regarded as 100 parts by mol, the total content (100×m) of Ca, Sr, and Ba meets $1.002 \leq m \leq 1.100$ in terms of parts by mol, the molar ratio s of Ti/(Zr+Ti) is $0 \leq s \leq 0.50$, the molar ratio y of Sr/(Ca+Sr+Ba) is $0 \leq y \leq 0.29$, and the molar ratio z of Ba/(Ca+Sr+Ba) is $0 \leq z \leq 0.29$, and y and z satisfy $0 \leq y+z \leq 0.29$.

Furthermore, the dielectric layers 2 further contain Si, Mn, and Al, and when the total content of Zr and Ti is regarded as 100 parts by mol, the Si content n meets $0.5 \leq n \leq 10$ in terms of parts by mol, the Mn content u meets $0.5 \leq u \leq 10$ in terms of parts by mol, and the Al content w meets $0.02 \leq w \leq 4$ in terms of parts by mol, m and n satisfy $-0.4 \leq 100(m-1)-n \leq 3.9$.

The content of the Si compound falls within the range of $0.5 \leq n \leq 10$ in terms of parts by mol. n is 0.5 parts by mol or more, because the lifetime characteristics are decreased in a moisture resistance loading test if n is less than 0.5 parts by mol. In addition, n is 10 parts by mol or less, because the electrostatic capacitance is decreased if n is more than 10 parts by mol.

The content of the Mn compound falls within the range of $0.5 \leq u \leq 10$ in terms of parts by mol. u is 0.5 parts by mol or more, because the sinterability is decreased if u is less than 0.5 parts by mol. In addition, u is 10 parts by mol or less, because the Q value is decreased if u is more than 10 parts by mol.

The content of the Al compound falls within the range of $0.02 \leq w \leq 4$ in terms of parts by mol. This is because the lifetime characteristics in a moisture resistance loading test are decreased if w falls outside this range.

The present invention is characterized in that m and the content n of the Si compound satisfy the relationship of $-0.4 \leq 100(m-1)-n \leq 3.9$. In the present invention, m falls within the range of $1.002 \leq m \leq 1.10$, which means that Ca and Sr and Ba are present excessively over Ti and Zr. In this case, Si may take in the excessive Ca to form a secondary phase. Further, when the relationship of $-0.4 \leq 100(m-1)-n \leq 3.9$ is satisfied as in the present invention, it is considered that the excessive Ca forming no secondary phase may remain at grain boundaries to act as a reaction inhibiting substance, thereby serving to suppress the increase in crystal grain size in the ceramic containing, as its main constituent, the perovskite-type compound containing Ca and Zr and optionally containing Sr, Ba, and Ti in some cases. As a result, residual stress in the dielectric layers 2 can be suppressed, and a laminated ceramic capacitor is thus achieved which produces excellent lifetime characteristics in a moisture resistance loading test. In addition, when the increase in crystal grain size is suppressed by this method, the COG characteristics are satisfied, and the decrease in electrostatic capacitance is also suppressed.

In addition, m and the Si content n preferably satisfy the relationship of $0 \leq 100(m-1)-n \leq 2.0$. In this case, a laminated ceramic capacitor is achieved which produces further excellent lifetime characteristics in a moisture resistance loading test.

It is to be noted that the Si, Mn, and Al may be present in any form. The Si, Mn, and Al may be present as oxides at grain boundaries, or as solid solutions in the main constituent grains.

The raw material powder for the dielectric ceramic is prepared, for example, by a solid-phase synthesis method. Specifically, first, compound powders such as oxides, carbonates, chlorides, and metal organic compounds including constituent elements for the main constituent are mixed in predetermined proportions, and subjected to calcination. It is to be noted that a hydrothermal method or the like may be applied, besides the solid-phase synthesis method. Further, alkali metals, transition metals, Cl, S, P, Hf, etc. may be contained in the dielectric ceramic according to the present invention, to such an extent that the effect of the present invention is not hindered.

The laminated ceramic capacitor is, for example, manufactured as follows. The raw material powder for the dielectric ceramic, which is obtained in the way described above, is used to prepare ceramic slurry. Then, ceramic green sheets are formed by a sheet forming method or the like. Then, a conductive paste to serve as internal electrodes is applied by printing or the like onto predetermined ceramic green sheets among the plurality of ceramic green sheets. Then, the plurality of ceramic green sheets stacked is then subjected to pressure bonding to obtain a raw laminated body. Next, the raw laminated body is subjected to firing. In this firing step, the raw material powders for the dielectric ceramic are fired to provide dielectric layers composed of the dielectric ceramic. Thereafter, external electrodes are formed by baking or the like on end surfaces of the laminated body.

Next, experimental examples will be described which were carried out according to the present invention.

Experimental Example 1

(A) Preparation of Raw Material Powder for Dielectric Ceramic

Respective powders of $CaCO_3$, $SrCO_3$, $BaCO_3$, $TiO_2$, and $ZrO_2$ with a purity of 99% or more were prepared as materials constituting the main constituent. Then, these powders were weighed for the molar ratio y of $Sr/(Ca+Sr+Ba)$, the molar ratio z of $Ba/(Ca+Sr+Ba)$, the molar ratio s of $Ti/(Zr+Ti)$, and the total content $100 \times m$ of Ca, Sr, and Ba in terms of parts by mol with respect to 100 parts by mol of the total content of Zr and Ti, subjected to wet mixing in a ball mill, then drying and grinding. This powder was subjected to calcination at 1100 to 1300° C. in the atmosphere, and then to grinding to obtain a first main constituent powder. Table 1 shows the values of y, z, s, and m for each sample.

It is to be noted that the method for producing the main constituent is not particularly limited, which may be a solid-phase method, a hydrothermal method, or the like, and the materials are also not particularly limited, which may be carbonates, oxides, hydroxides, chlorides, etc. In addition, the main constituent may contain inevitable impurities such as $HfO_2$.

TABLE 1

| Sample No. | y | z | s | m | n | [100(m − 1) − n] | u | w | Lifetime in Moisture Resistance Loading (250 hours) | Lifetime in Moisture Resistance Loading (500 hours) |
|---|---|---|---|---|---|---|---|---|---|---|
| 1 | 0.01 | 0 | 0.01 | 1.012 | 1.5 | −0.3 | 1.5 | 0.06 | 2/100 | 20/100 |
| 2 | 0.01 | 0 | 0.01 | 1.017 | 1.5 | 0.2 | 1.5 | 0.08 | 0/100 | 0/100 |
| 3 | 0.01 | 0 | 0.01 | 1.022 | 1.5 | 0.7 | 1.5 | 0.10 | 0/100 | 0/100 |
| 4 | 0.01 | 0 | 0.01 | 1.030 | 1.5 | 1.5 | 1.5 | 0.10 | 0/100 | 0/100 |
| 5 | 0.01 | 0 | 0.01 | 1.035 | 1.5 | 2.0 | 1.5 | 1.00 | 0/100 | 0/100 |
| 6 | 0.01 | 0 | 0.01 | 1.040 | 2.0 | 2.0 | 1.5 | 1.00 | 0/100 | 0/100 |
| 7 | 0.01 | 0 | 0.01 | 1.030 | 2.0 | 1.0 | 2.5 | 1.50 | 0/100 | 0/100 |
| 8 | 0.01 | 0 | 0.01 | 1.030 | 2.6 | 0.4 | 2.0 | 2.00 | 0/100 | 0/100 |
| 9 | 0.01 | 0 | 0.01 | 1.040 | 2.6 | 1.4 | 3.0 | 0.05 | 0/100 | 0/100 |
| 10 | 0.01 | 0 | 0.01 | 1.050 | 3.0 | 2.0 | 5.0 | 0.05 | 0/100 | 0/100 |
| 11 | 0.01 | 0 | 0.01 | 1.060 | 5.5 | 0.5 | 6.0 | 0.05 | 0/100 | 0/100 |
| 12 | 0.01 | 0 | 0.01 | 1.080 | 5.5 | 2.5 | 7.0 | 0.05 | 1/100 | 16/100 |
| 13 | 0.01 | 0 | 0.01 | 1.100 | 10.0 | 0.0 | 10.0 | 0.05 | 0/100 | 0/100 |
| *14 | 0.01 | 0 | 0.01 | 1.140 | 10.0 | 4.0 | 10.0 | 0.05 | 49/100 | 100/100 |
| *15 | 0.01 | 0 | 0.01 | 1.140 | 11.0 | 3.0 | 11.0 | 2.10 | 71/100 | 100/100 |
| 16 | 0.01 | 0 | 0.01 | 1.010 | 0.5 | 0.5 | 0.5 | 0.01 | 0/100 | 0/100 |
| 17 | 0.01 | 0 | 0.01 | 1.002 | 0.5 | −0.3 | 0.5 | 0.01 | 1/100 | 24/100 |
| *18 | 0.01 | 0 | 0.01 | 1.000 | 0.2 | −0.2 | 0.2 | 0.00 | 82/100 | 100/100 |
| *19 | 0.01 | 0 | 0.01 | 1.015 | 2.5 | −1 | 2.5 | 0.08 | 98/100 | 100/100 |
| *20 | 0.01 | 0 | 0.01 | 1.020 | 2.5 | −0.5 | 2.5 | 0.08 | 60/100 | 100/100 |
| 21 | 0.01 | 0 | 0.01 | 1.021 | 2.5 | −0.4 | 2.5 | 0.08 | 2/100 | 19/100 |
| 22 | 0.01 | 0 | 0.01 | 1.035 | 2.5 | 1.0 | 2.5 | 0.08 | 0/100 | 0/100 |
| 23 | 0.01 | 0 | 0.01 | 1.046 | 2.5 | 2.1 | 2.5 | 0.05 | 1/100 | 11/100 |
| 24 | 0.01 | 0 | 0.01 | 1.064 | 2.5 | 3.9 | 2.5 | 0.05 | 2/100 | 26/100 |
| *25 | 0.01 | 0 | 0.01 | 1.065 | 2.5 | 4.0 | 2.5 | 0.05 | 55/100 | 100/100 |
| 26 | 0 | 0 | 0.01 | 1.030 | 2.8 | 0.2 | 2.5 | 0.05 | 0/100 | 0/100 |
| 27 | 0.01 | 0 | 0.50 | 1.030 | 2.8 | 0.2 | 2.5 | 0.05 | 0/100 | 0/100 |
| 28 | 0.29 | 0 | 0.05 | 1.030 | 2.8 | 0.2 | 2.5 | 0.05 | 0/100 | 0/100 |
| *29 | 0.30 | 0 | 0.03 | 1.030 | 3.8 | −0.8 | 2.5 | 0.20 | 85/100 | 100/100 |
| 30 | 0 | 0 | 0 | 1.030 | 2.8 | 0.2 | 3.3 | 0.08 | 0/100 | 0/100 |
| 31 | 0.20 | 0.09 | 0.01 | 1.030 | 2.0 | 1.0 | 2.5 | 0.05 | 0/100 | 0/100 |
| 32 | 0.10 | 0.19 | 0.01 | 1.030 | 2.0 | 1.0 | 2.5 | 0.05 | 0/100 | 0/100 |
| 33 | 0.00 | 0.29 | 0.01 | 1.030 | 2.0 | 1.0 | 2.5 | 0.05 | 0/100 | 0/100 |

Subsequently, respective powders of $SiO_2$, $MnCO_3$, and $Al_2O_3$ were prepared as additive materials. These powders were weighed for the Si content n in terms of parts by mol, the Mn content u in terms of parts by mol, and the Al content w in terms of parts by mol with respect to the total content, 100 parts by mol of Zr and Ti in the first main constituent powder, and the value in Table 1 for 100(m−1)−n, then blended with the first main constituent powder, and subjected to wet mixing in a ball mill, then drying and grinding to obtain raw material powders. Table 1 shows the values of n, u, and w for each sample.

It is to be noted that $CaCO_3$, $SrCO_3$, $BaCO_3$, $TiO_2$, and $ZrO_2$ may be added at this stage for the adjustment of the molar ratio, or the like. Further, the sample numbers marked with * in Table 1 fall outside the scope of the present invention.

Further, it has been confirmed by an ICP analysis that the obtained raw material powders are nearly identical to the prepared compositions shown in Table 1.

(B) Production of Laminated Ceramic Capacitor

First, ceramic green sheets to serve as dielectric layers were formed. Specifically, the raw material powder described above was subjected to wet mixing in a ball mill with the addition of a polyvinyl butyral based binder and an organic solvent such as toluene and ethanol to the powder, thereby preparing slurry. Then, this slurry was subjected to sheet forming by a doctor blade method, and cut to obtain rectangular ceramic green sheets of approximately 15 cm×15 cm×6 µm.

Then, a conductive paste containing Ni as its main constituent was printed on the ceramic green sheets to form conductive paste layers for constituting internal electrodes of a laminated capacitor. A paste including 100 parts by weight of Ni powder as a metal powder, 7 parts by weight of ethyl cellulose as an organic vehicle, and terpineol as a solvent was used for the conductive paste.

Next, the plurality of ceramic green sheets with the conductive paste layers formed was stacked so as to alternate the sides to which the conductive paste layers are extracted, thereby providing a laminated body of the ceramic green sheet. This laminated body was cut to obtain individual pieces of the stacked body. These laminated bodies were heated to a temperature of 250° C. in the atmosphere to burn the binder, and then subjected to firing at a rate of temperature increase of 3.33° C./min, a maximum temperature of 1200 to 1300° C., and an oxygen partial pressure of $10^{-9}$ to $10^{-11}$ MPa, thereby providing ceramic sintered bodies.

These sintered laminated bodies were dissolved in a solvent, and subjected to an ICP analysis to confirm that the bodies are nearly identical to the prepared compositions shown in Table 1, except for Ni as an internal electrode constituent.

This sintered body was subjected to barreling to expose internal electrodes from end surfaces, and an external electrode Cu paste was applied onto the exposed internal electrodes. The external electrode Cu paste was dried, and the then subjected to baking at a top temperature of 800° C. in a neutral or reducing atmosphere to provide external electrodes. Subsequently, a Ni plating layer was formed on the external electrodes by a barrel plating method, and a Sn plating layer was subsequently formed thereon in the same way.

The laminated capacitor obtained in this way had external dimensions of width: 1.2 mm, length: 2.0 mm, and thickness: 0.6 mm, and the dielectric ceramic layers were 5 µm in thickness. In addition, the total number of effective dielectric ceramic layers was 80.

(C) Moisture Resistance Loading Test

The following evaluation was carried out for the laminated ceramic capacitors prepared.

First, the laminated ceramic capacitors according to each experimental condition were subjected to an accelerated moisture resistance loading test (PCBT) under the conditions of temperature: 121° C., moisture: 100% RH, atmospheric pressure: 2 atm, applied voltage: 50 V; and the number of samples 100. Then, the number of samples with the value of log IR down to 6 or less was counted as defectives after a lapse of 250 hours and after a lapse of 500 hours.

Table 1 shows, for the samples according to each experimental condition, the molar ratio y of Sr/(Ca+Sr+Ba), the molar ratio z of Ba/(Ca+Sr+Ba), the molar ratio of Ti/(Zr+Ti), m of the total content (100×m) of Ca, Sr, and Ba in terms of parts by mol in the case of regarding the total content of Zr and Ti as 100 parts by mol, the Si content n (parts by mol), the Mn content u (parts by mol), the Al content w (parts by mol), 100(m−1)−n, and the results of the moisture resistance loading test. Further, the sample numbers marked with * in Table 1 refer to samples which fall outside the scope of the present invention.

The incidence of defectives after 250 hours is several % or less within the scope of the present invention, whereas the incidence of defectives is clearly increased outside the scope thereof. Furthermore, particularly with the range of [100(m−1)−n] limited to 0≤100(m−1)−n≤2.0, due to the increased effect, no defective was caused even in the case of the lapse time of 500 hours.

Sample number 14 has large m of 1.140, and a large value of 4 for 100(m−1)−n. Therefore, forty-nine defectives were caused in the moisture resistance loading test after a lapse of 250 hours.

Sample number 15 has large m of 1.140, and large n of 11.0 in parts by mol. In addition, sample number 15 has large u of 11.0 in parts by mol, and large w of 2.10 in parts by mol. Therefore, seventy-one defectives were caused in the moisture resistance loading test after a lapse of 250 hours.

Sample number 18 has small m of 1.000, and small n of 0.2 in parts by mol. In addition, sample number 18 has small u of 0.2 in parts by mol, and small w of 0.00 in parts by mol. Therefore, eighty-two defectives were caused in the moisture resistance loading test after a lapse of 250 hours.

Sample numbers 19 and 20 both have small values for 100(m−1)−n.

Therefore, ninety-eight and sixty defectives were caused respectively in the moisture resistance loading test after a lapse of 250 hours.

Sample number 25 has a large value of 4.0 for 100(m−1)−n. Therefore, fifty-five defectives were caused in the moisture resistance loading test after a lapse of 250 hours.

Sample number 29 has a large value of 0.30 for y+z, and has a small value of −0.80 for 100(m−1)−n. Therefore, eighty-five defectives were caused in the moisture resistance loading test after a lapse of 250 hours.

In addition, in the case of sample numbers 14, 15, 18 to 20, 25, and 29, all of the samples were regarded as defectives in the moisture resistance loading test after a lapse of 500 hours.

On the other hand, in the case of sample numbers 1 to 13, 16, 17, 21 to 24, 26 to 28, and 30 to 33, the lifetime characteristics in the moisture resistance loading test were regarded as favorable results.

In addition, sample numbers 2 to 11, 13, 16, 22, 26 to 28, and 30 to 33 which fall within the range of 0≤100(m−1)−n≤2.0, caused no defective even in the moisture resistance loading test after a lapse of 500 hours, and produced favorable results particularly for the lifetime characteristics.

While (Ca, Ba, Sr)(Ti, Zr)O₃ based perovskite structure ceramics are likely to have residual stress increased, and thus cause electrode peeling defects in a moisture resistance loading test or the like to reduce the lifetimes, the achievement of the composition according to the present invention is considered to be able to reduce the stress, and significantly remedy the percent defective.

It is to be noted that insufficiently fine grains will not remedy the percent defective in the case of the lower limit deviated from the range of −0.4≤100(m−1)−n≤3.9. On the other hand, in the case of the upper limit deviated therefrom, the percent defective will not be remedied due to insufficient firing.

DESCRIPTION OF REFERENCE SYMBOLS 1 laminated ceramic capacitor
2 dielectric layer
3, 4 internal electrode
5 laminated body
6, 7 external electrode

The invention claimed is:

1. A method for manufacturing a laminated ceramic capacitor, the method comprising:
preparing a main constituent powder containing, as a main constituent thereof, a perovskite-type compound containing Ca and Zr;
preparing a Si compound, a Mn compound, an Al compound;
mixing the main constituent powder, the Si compound, the Mn compound, and the Al compound to form a ceramic slurry;
forming ceramic green sheets from the ceramic slurry;
stacking the ceramic green sheets and internal electrode layers to obtain an unfired laminated body; and
firing the unfired laminated body to obtain a laminated body with internal electrodes between dielectric layers,
wherein, for respective elements of the dielectric layers, when the total of Zr is regarded as 100 parts by mol,
the total content (100×m) of Ca meets $1.002 \leq m \leq 1.100$ in terms of parts by mol,
the Si content n meets $0.5 \leq n \leq 10$ in terms of parts by mol,
the Mn content u meets $0.5 \leq u \leq 10$ in terms of parts by mol, and
the Al content w meets $0.02 \leq w \leq 4$ in terms of parts by mol,
m and n satisfying $-0.4 \leq 100(m-1)-n \leq 3.9$.

2. The method for manufacturing a laminated ceramic capacitor according to claim 1, wherein the perovskite-type compound further contains at least one selected from the group consisting of Sr, Ba, and Ti, and
when the total content of Zr and Ti is regarded as 100 parts by mol,
the total content (100×m) of Ca, Sr, and Ba meets $1.002 \leq m \leq 1.100$ in terms of parts by mol,
a molar ratio s of Ti/(Zr+Ti) is $0 \leq s \leq 0.50$,
a molar ratio y of Sr/(Ca+Sr+Ba) is $0 \leq y \leq 0.29$, and
a molar ratio z of Ba/(Ca+Sr+Ba) is $0 \leq z \leq 0.29$, y and z satisfying $0 \leq y+z \leq 0.29$.

3. The method for manufacturing a laminated ceramic capacitor according to claim 2, wherein a relationship of $0 \leq 100(m-1)-n \leq 2.0$ is satisfied.

4. The method for manufacturing a laminated ceramic capacitor according to claim 1, wherein a relationship of $0 \leq 100(m-1)-n \leq 2.0$ is satisfied.

* * * * *